United States Patent
Iimura et al.

(10) Patent No.: US 12,055,240 B2
(45) Date of Patent: Aug. 6, 2024

(54) DIAPHRAGM AND DIAPHRAGM VALVE

(71) Applicant: Nippon Daiya Valve Co., Ltd., Tokyo (JP)

(72) Inventors: Katsuaki Iimura, Tokyo (JP); Takashi Mitani, Tokyo (JP)

( * ) Notice: Subject to any disclaimer, the term of this patent is extended or adjusted under 35 U.S.C. 154(b) by 0 days.

(21) Appl. No.: 18/095,455

(22) Filed: Jan. 10, 2023

(65) Prior Publication Data

US 2023/0366472 A1  Nov. 16, 2023

(30) Foreign Application Priority Data

May 16, 2022  (JP) .................................. 2022-080315

(51) Int. Cl.
*F16K 7/17* (2006.01)

(52) U.S. Cl.
CPC ...................... *F16K 7/17* (2013.01)

(58) Field of Classification Search
CPC ...................... F16K 7/12; F16K 7/17
See application file for complete search history.

(56) References Cited

U.S. PATENT DOCUMENTS

| | | | |
|---|---|---|---|
| 2,918,089 A * | 12/1959 | McFarland, Jr. | F16K 7/126 251/331 |
| 6,508,266 B2 * | 1/2003 | Iritani | F16K 7/126 73/40.5 R |
| 2015/0144822 A1 | 5/2015 | Akamoto et al. | |
| 2015/0167853 A1 | 6/2015 | Obara et al. | |
| 2022/0186844 A1 | 6/2022 | Obara et al. | |
| 2024/0093791 A1 * | 3/2024 | Knoles | F16K 7/16 |

FOREIGN PATENT DOCUMENTS

| | | |
|---|---|---|
| EP | 1462693 A1 | 9/2004 |
| JP | S59000577 U | 1/1984 |
| JP | 60014232 | 4/1985 |
| JP | S60118072 U | 8/1985 |
| JP | 07208623 | 8/1995 |
| JP | 09196200 | 7/1997 |
| JP | 10288264 | 10/1998 |
| JP | H11210902 A | 8/1999 |
| JP | 2004278669 A | 10/2004 |
| JP | 2014070655 A | 4/2014 |
| JP | 2015197119 A | 11/2015 |

(Continued)

OTHER PUBLICATIONS

WO-2022123856-A1, Translation (Year: 2022).*

(Continued)

*Primary Examiner* — Daphne M Barry

(57) ABSTRACT

A diaphragm valve 100 includes a valve body 10, a diaphragm 20, a bonnet 40, and a compressor 60. The diaphragm 20 includes a first portion 21 and a second portion 22 surrounding the first portion 21, the first portion 21 having a first thickness T1 and a curved plate shape, the second portion 22 having a second thickness T2 smaller than the first thickness T1 to form a step and having a flat plate shape. The second portion 22 includes a sealing band SB surrounding the first portion 21. The bonnet 40 has an inner step 43 that contains a part of the first portion 21 and the inner step 43 has a depth G in the Z direction larger than a difference T1−T2 between the first and second thicknesses.

11 Claims, 6 Drawing Sheets

(56) References Cited

FOREIGN PATENT DOCUMENTS

| | | |
|---|---|---|
| JP | 2020139155 A | 9/2020 |
| JP | 2020165477 A | 10/2020 |
| WO | 2013179738 A1 | 12/2013 |
| WO | 2020203553 A1 | 10/2020 |
| WO | WO-2022123856 A1 * | 6/2022 |

OTHER PUBLICATIONS

Japan Patent Office rejection letter of Japan Patent Application No. 2022-080315, dated Jun. 28, 2022.
Japan Patent Office rejection letter of Japan Patent Application No. 2022-130315, dated Sep. 19, 2023.
Taiwan Patent Office rejection letter of Taiwan Patent Application No. 112106973, dated Sep. 20, 2023.
Rejection of Korean Patent Application No. 10-2023-0018360, dated May 29, 2024.

* cited by examiner

DIAPHRAGM AND DIAPHRAGM VALVE

TECHNICAL FIELD

The present disclosure relates to a diaphragm and a diaphragm valve.

BACKGROUND ART

FIG. 8A is a sectional view of a conventional diaphragm valve 100a. The right half portion of FIG. 8A shows an open state (S1) and the left half portion shows a closed state (S2). The diaphragm valve 100a includes a valve body 10, a diaphragm 20a, a bonnet 40a, and a compressor 60.

The valve body 10 is provided between first and second flow paths C1 and C2. The bonnet 40a contains the compressor 60, presses the peripheral portion of the diaphragm 20a against the valve body 10, and is fixed to the valve body 10 by bolts 30 and nuts 50. The inner portion of the diaphragm 20a is fixed to the compressor 60 and the compressor 60 reciprocates within the bonnet 40a. The diaphragm 20a is thus switched between the open state (S1) to form with the valve body 10 a communication channel of the fluid between the flow paths C1 and C2 and the closed state (S2) to close the communication channel between the flow paths C1 and C2.

Among the components of the diaphragm valve 100a, only the valve body 10 and the diaphragm 20a contact the fluid and the driving mechanism including the compressor 60 is isolated from the communication channel. Such diaphragm valve has advantages in that the fluid, which does not contact the driving mechanism, is not contaminated and the driving mechanism, which does not contact the fluid, is not deteriorated. Diaphragm valves are thus widely used in pharmaceutical factories, semiconductor factories, chemical plants, and the like.

The diaphragm 20a includes a cushion rubber 20c and a sealing member 20s. The sealing member 20s is made of PTFE (polytetrafluoroethylene), which is a fluororesin, having good chemical resistance. The cushion rubber 20c is made of a material having an elastic modulus smaller than the sealing member 20s and thus causes the diaphragm 20a to closely contact the valve body 10 without a gap even there are slight individual differences in the form of the valve body 10 or the compressor 60.

LIST OF PRIOR ART DOCUMENTS

Patent Document 1: Japanese Examined Patent Publication No. S60-14232 B

Problem to be Solved by the Invention

In order to prevent a leak of the fluid from the diaphragm valve 100a, namely, to achieve an external seal, it is important to ensure seal contact pressure between the peripheral portion of the diaphragm 20a and the valve body 10. The seal contact pressure is provided by reaction force caused by compression of the cushion rubber 20c tightened by the bolts 30 and nuts 50.

FIG. 8B is a graph showing a change in the reaction force in the cushion rubber 20c. The horizontal axis of FIG. 8B shows elapsed time T in a logarithmic scale from the time of tightening the bolts 30 and nuts 50 and the vertical axis shows the reaction force F. The polygonal line F1 shows characteristics after a first-time tightening and the straight line F2 shows characteristics after a second-time tightening.

The reaction force F caused by the compression of the cushion rubber 20c rapidly reduces immediately after the first-time tightening. The reduction in the reaction force F is then moderated after approximately 1 hour from the first-time tightening, and goes substantially in proportion to a logarithm of the elapsed time T. After the reduction in the reaction force F is moderated, the second-time tightening of the bolts 30 and nuts 50 may be performed with the same torque as the first-time tightening. The reaction force F thus recovers to some extent and then, without reducing rapidly, reduces substantially in proportion to a logarithm of the elapsed time T. Therefore, an assembling process of the diaphragm valve 100a preferably includes the first-time tightening of the bolts 30 and nuts 50 with a prescribed tightening torque and then, for example, 4 hours later, the second-time tightening with the prescribed tightening torque.

However, requiring the two stages of tightening of the bolts 30 and nuts 50 at separate times to ensure the seal contact pressure may cause a complex assembling process and reduction of installation efficiency.

Increasing the tightening torque of the bolts 30 and nuts 50 may improve the seal contact pressure between the peripheral portion of the diaphragm 20a and the valve body 10 and improve external seal performance.

However, excessive tightening torque of the bolts 30 and nuts 50 may cause the cushion rubber 20c to extend out, the reaction force F to be reduced, and the seal contact pressure between the peripheral portion of the diaphragm 20a and the valve body 10 to be reduced. FIGS. 8C to 8E each are an enlarged view of an enclosed portion VIIICDE of FIG. 8A. Specifically, FIG. 8C shows a state in which tightening of the bolts 30 and nuts 50 has not been made, FIG. 8D shows a state in which tightening with the proper torque has been made, and FIG. 8E shows a state in which tightening with the excessive torque has been made. Tightening with the proper torque causes the cushion rubber 20c to slightly deform and extend out, however, appropriate reaction force F is achieved. Tightening with the excessive torque causes the cushion rubber 20c to significantly extend out and the appropriate reaction force F is not achieved.

Patent Document 1 (Japanese Examined Patent Publication No. S60-14232 B) teaches a diaphragm valve including a diaphragm 2 having a step along the peripheral portion, the step providing an outer thin gasket portion 2b and an inner thick portion 2c. FIGS. 9A to 9C show some figures from Patent Document 1. According to Patent Document 1, the thin gasket portion 2b in the periphery of the diaphragm 2 suppresses the diaphragm 2 from extending out in the radially outward direction when bolts 3 and nuts 5 are tightened. Accordingly, stability in the tightening stress of the gasket portion 2b is achieved.

As shown in FIGS. 9A and 9B, in Patent Document 1, a sealing band 2a, which performs seal of the diaphragm 2 and the valve body 1, is provided on the thick portion 2c.

However, in order to perform the seal with the sealing band 2a, it is necessary to press the thick portion 2c including the sealing band 2a with the inner step 4c of the bonnet 4 to generate sufficient reaction force F in the thick portion 2c. Tightening the bolts 3 and nuts 5 with a high tightening torque provides high seal contact pressure in the gasket portion 2b of the diaphragm 2. However, a part of the thick portion 2c of the diaphragm 2 may inwardly extend out, which causes the reaction force F in the thick portion 2c to be reduced, and thus the seal contact pressure on the sealing band 2a may not be sufficient. FIG. 9D is an enlarged view of an enclosed portion IXD of FIG. 9A, showing a situation in which a part of the thick portion 2c is inwardly extending out by a high tightening torque.

Means to Solve the Problem

An aspect of the present invention relates to a diaphragm that is pressed against a valve body and configures a diaphragm valve, the diaphragm comprising:
a first portion having a first thickness and a curved plate shape; and
a second portion surrounding the first portion, the second portion having a second thickness smaller than the first thickness to form a step and having a flat plate shape, the second portion including a sealing band surrounding the first portion.

A diaphragm valve according to an aspect of the present invention comprises:
a valve body provided between first and second flow paths;
a diaphragm including first and second portions, the first portion having a first thickness and a curved plate shape, the second portion surrounding the first portion, the second portion having a second thickness smaller than the first thickness to form a step and having a flat plate shape, the second portion including a sealing band surrounding the first portion, the diaphragm capable of being switched between first and second states, the diaphragm configuring with the valve body a communication channel between the first and second flow paths in the first state, the diaphragm closing the communication channel between the first and second flow paths in the second state;
a compressor configured to apply pressing force pressing the first portion against the valve body in a pressing direction to switch the diaphragm to the second state and configured to release the pressing force pressing the first portion against the valve body to switch the diaphragm to the first state; and
a bonnet configured to press the second portion against the valve body.

A diaphragm valve according to another aspect of the present invention comprises:
a valve body provided between first and second flow paths;
a diaphragm including first and second portions, the first portion having a first thickness, the second portion surrounding the first portion, the second portion having a second thickness smaller than the first thickness to form a step, the diaphragm capable of being switched between first and second states, the diaphragm configuring with the valve body a communication channel between the first and second flow paths in the first state, the diaphragm closing the communication channel between the first and second flow paths in the second state;
a compressor configured to apply pressing force pressing the first portion against the valve body in a pressing direction to switch the diaphragm to the second state and configured to release the pressing force pressing the first portion against the valve body to switch the diaphragm to the first state; and
a bonnet including a tubular portion that contains the compressor, the tubular portion having a pressing surface and an inner step, the pressing surface pressing the second portion against the valve body, the inner step containing a part of the first portion, the inner step having a depth in the pressing direction larger than a difference between the first and second thicknesses.

BRIEF DESCRIPTION OF DRAWINGS

FIG. 8A is a sectional view of the conventional diaphragm valve 100a. FIG. 8C shows a state in which tightening of the bolts 30 and nuts 50 has not been made. FIG. 8D shows a state in which tightening with the proper torque has been made. FIG. 8E shows a state in which tightening with the excessive torque has been made.

EMBODIMENT

An embodiment of the present invention is described below in detail in reference to the drawings. The embodiment described below merely shows an example of the present invention and is not intended to limit the content of the present invention. The configuration and operation described in the embodiment are not necessarily indispensable for the configuration and operation of the present invention. The same reference symbols are assigned to the same constituent elements and redundant description is omitted.

1. Diaphragm Valve 100

Figure 1:
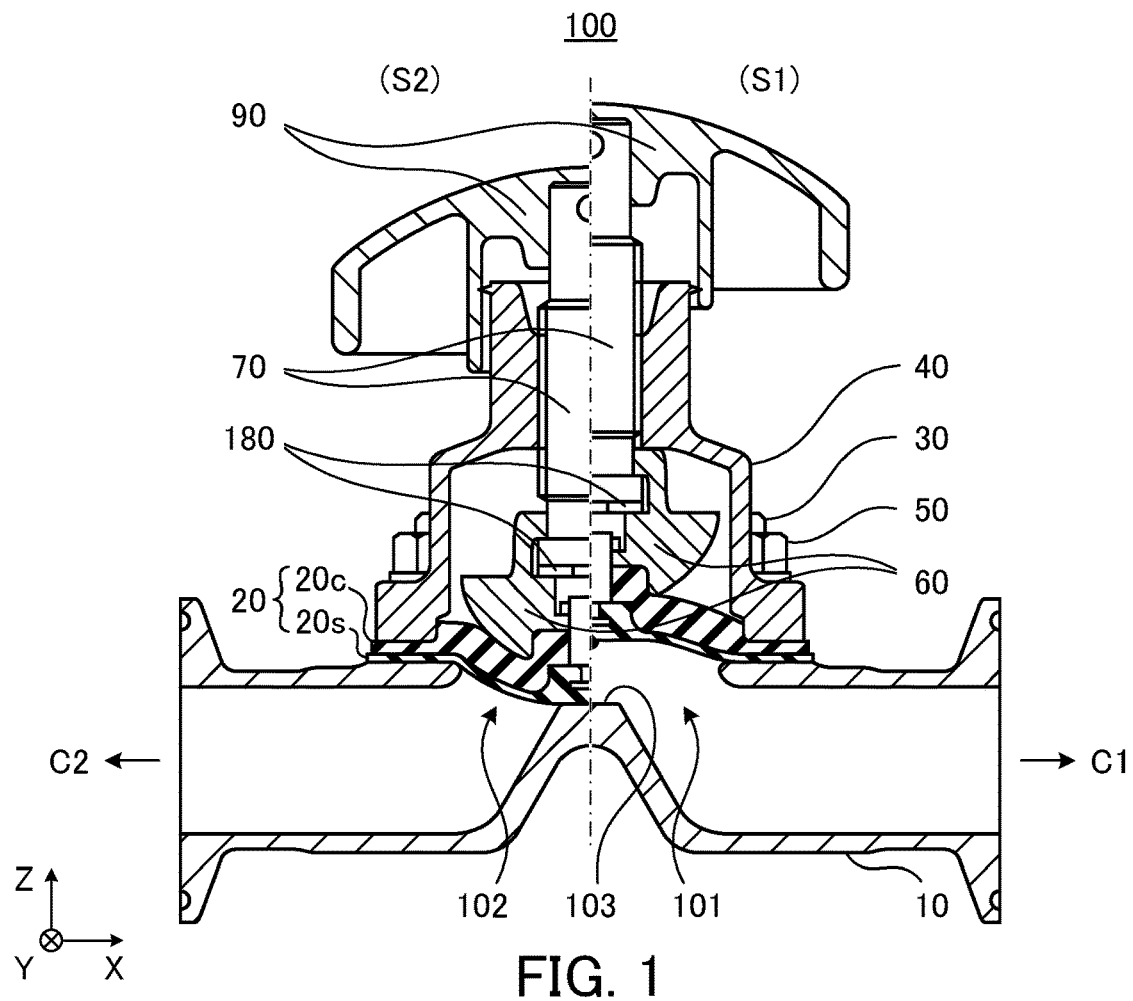
FIG. 1 is a sectional view of a diaphragm valve 100 according to an embodiment.
Figure 8A:
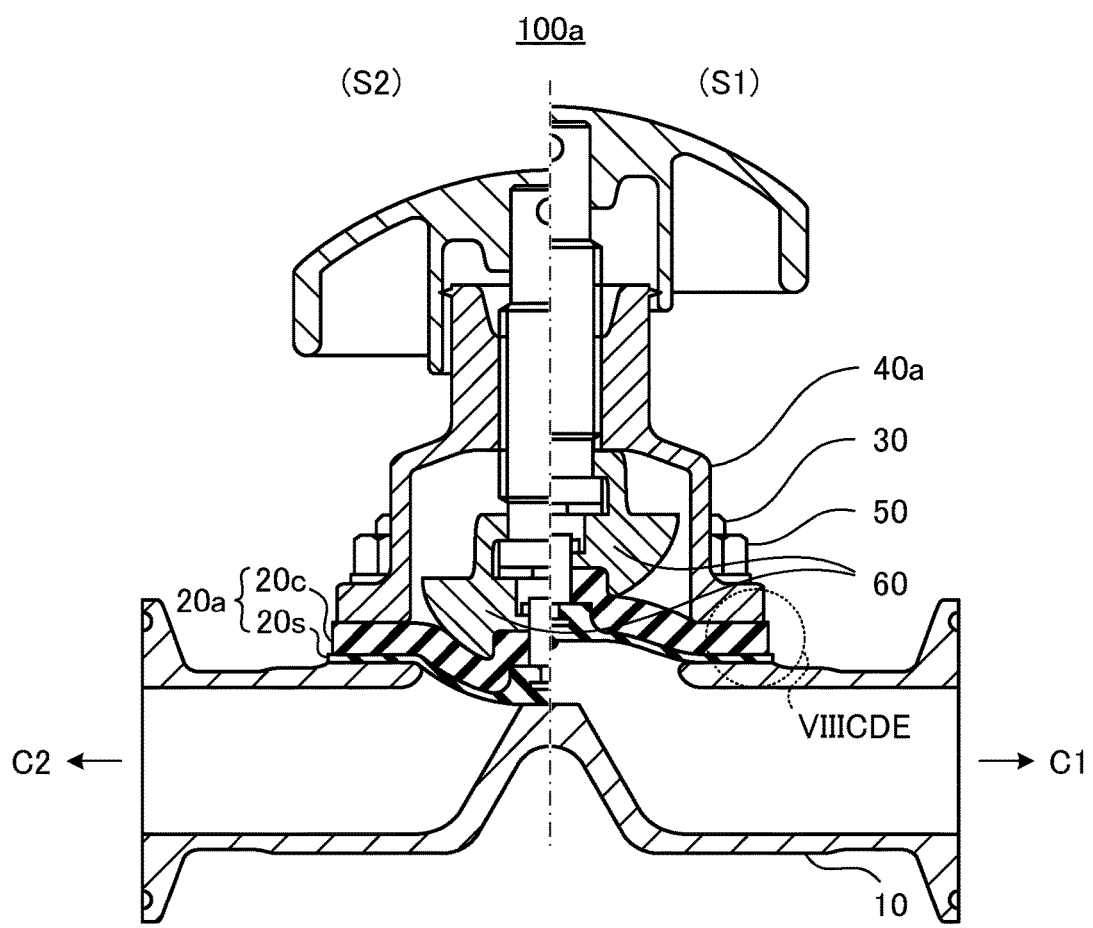
Figure 8B:
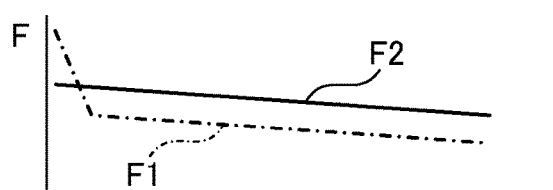
FIG. 8B is a graph showing a change in the reaction force in the cushion rubber 20c.
Figure 8C:
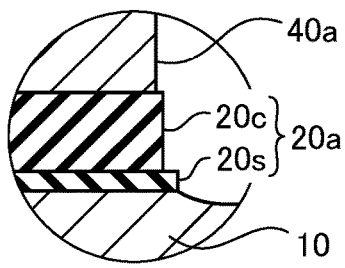
FIGS. 8C to 8E each are an enlarged view of the enclosed portion VIIICDE of FIG. 8A.
Figure 8D:
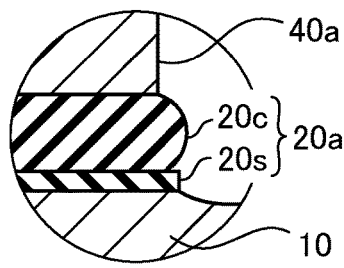
Figure 8E:
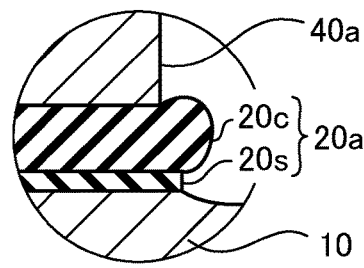
Figure 9A:
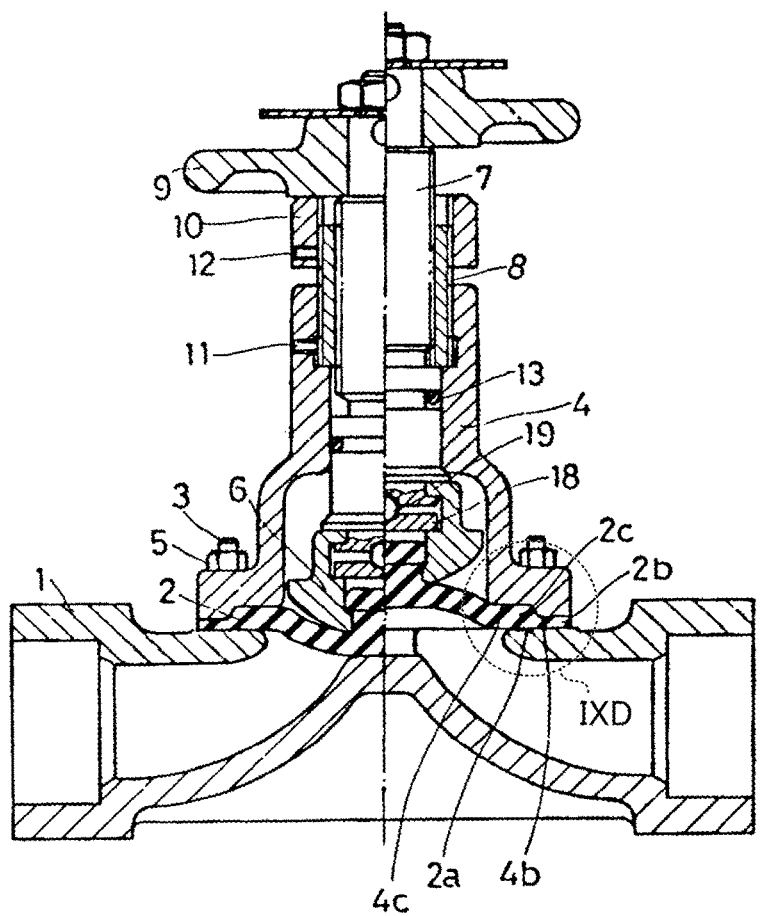
FIGS. 9A to 9C show some figures from Patent Document 1.
Figure 9B:
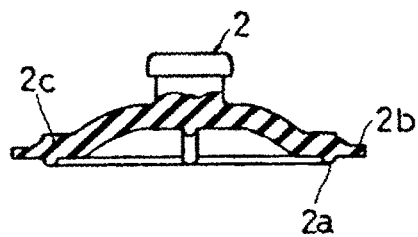
Figure 9C:
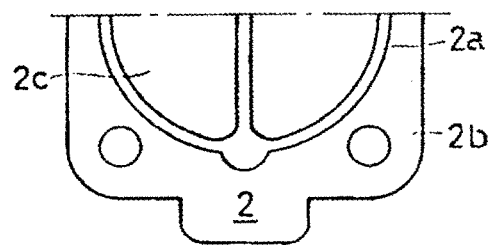
Figure 9D:
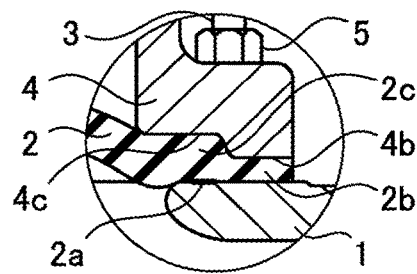
FIG. 9D is an enlarged view of the enclosed portion IXD of FIG. 9A, showing a situation in which a part of the thick portion 2c is inwardly extending out by the high tightening torque.

FIG. 1 is a sectional view of a diaphragm valve 100 according to an embodiment. The right half of FIG. 1 shows an open state (S1) and the left half shows a closed state (S2). The open state (S1) corresponds to the first state of the present invention and the closed state (S2) corresponds to the second state of the present invention. The diaphragm valve 100 is different from the conventional diaphragm valve 100a in that the diaphragm valve 100 includes a diaphragm 20 and a bonnet 40 instead of the diaphragm 20a and the bonnet 40a shown in FIG. 8A. The diaphragm 20 is described below in reference to FIGS. 3A to 3D and FIG. 4 and the bonnet 40 is described below in reference to FIGS. 5A to 5C.

The flow direction of the fluid in the valve body 10 is described below as an X or −X direction. The reciprocating direction of the compressor 60 in the bonnet 40 is described below as a Z or −Z direction. The X and Z directions are perpendicular to each other. The direction perpendicular to both the X and Z directions is described below as a Y or −Y direction. FIG. 1 shows a section of the diaphragm valve 100, the section being parallel to an XZ plane, seen in the Y direction.

The valve body 10 is provided between the first and second flow paths C1 and C2. The diaphragm 20 is capable of being switched between the open state (S1) in which the diaphragm 20 configures with the valve body 10 a communication channel of the fluid between the flow paths C1 and C2 and the closed state (S2) in which the diaphragm 20 closes the communication channel between the flow paths C1 and C2. The bonnet 40 contains the compressor 60, presses the peripheral portion of the diaphragm 20 against the valve body 10, and is fixed to the valve body 10 with the bolts 30 and nuts 50. The compressor 60 reciprocates in the bonnet 40 according to an operation of a threaded spindle 70 manipulated with, for example, a handle 90. The reciprocally moving compressor 60 fixed to the inner portion of the diaphragm 20 applies pressing force pressing the diaphragm 20 against the valve seat 103 of the valve body 10 to realize the closed state (S2) and releases the pressing force to realize the open state (S1). A thrust washer 180 is provided between the spindle 70 and the compressor 60, the spindle 70 being rotated by the operation of the handle 90, the compressor 60 not being rotated.

2. Valve Body 10

Figure 2:
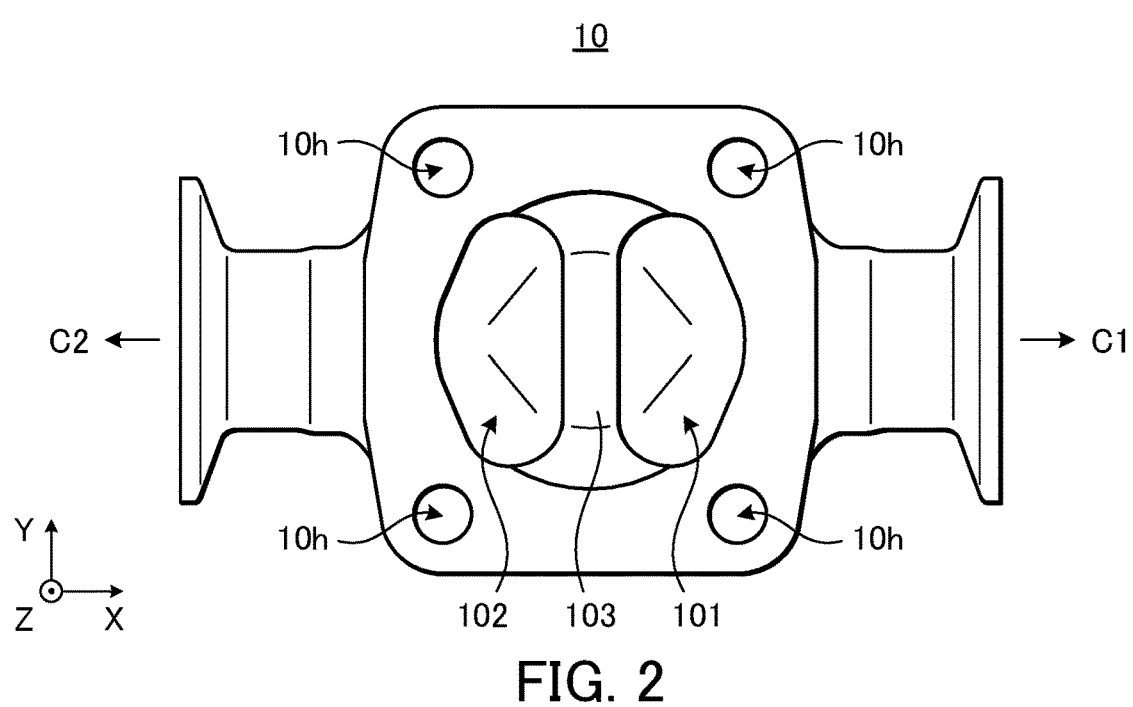
FIG. 2 is a plan view of a valve body 10 shown in FIG. 1.

FIG. 2 is a plan view of the valve body 10 shown in FIG. 1. FIG. 2 is a view of an external appearance of the valve body 10 seen in the −Z direction. The valve body 10 includes an opening 101 communicating with the flow path C1, an opening 102 communicating with the flow path C2, and a valve seat 103 positioned between the openings 101 and 102.

3. Diaphragm 20

Figure 3A:
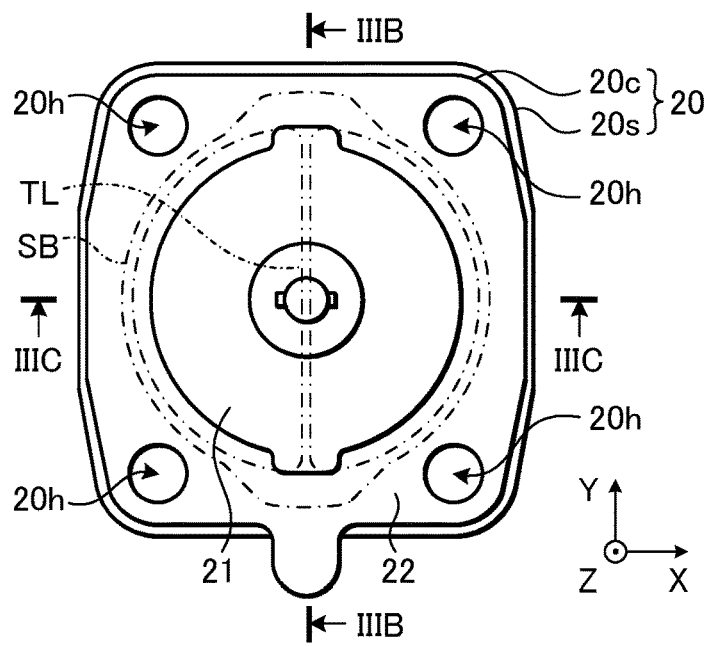
FIG. 3A is a plan view of a diaphragm 20 shown in FIG. 1.
Figure 3B:
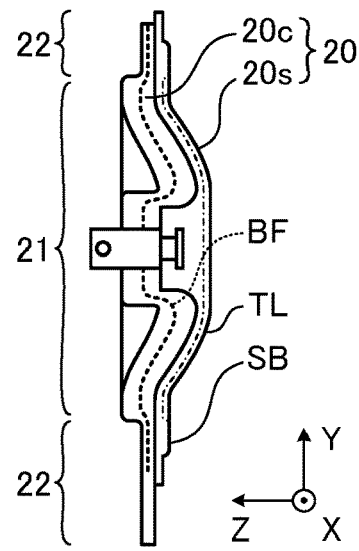
FIG. 3B is a sectional view at line IIIB-IIIB of FIG. 3A.
Figure 3C:
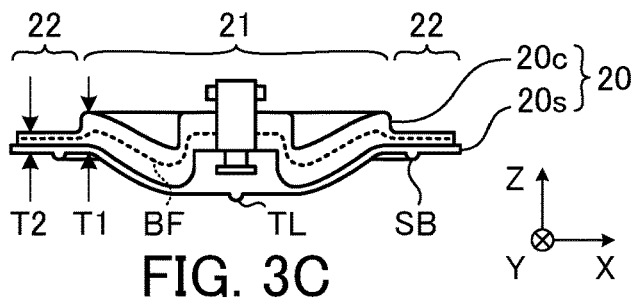
FIG. 3C is a sectional view at line IIIC-IIIC of FIG. 3A.
Figure 3D:
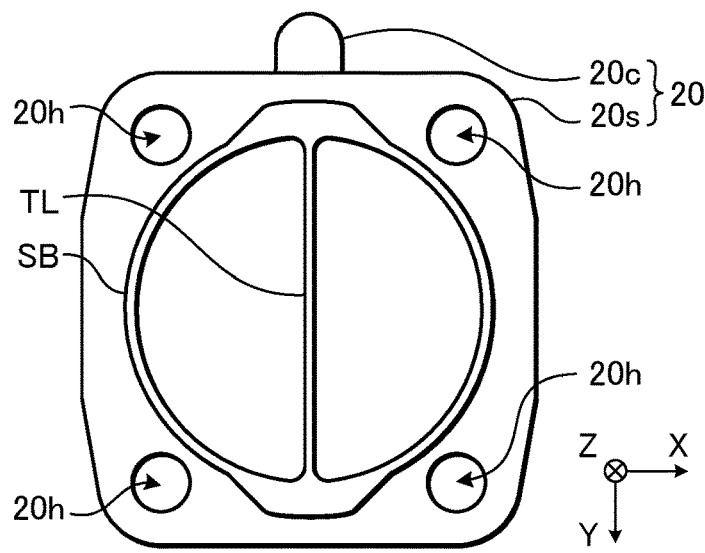
FIG. 3D is a bottom view of the diaphragm 20.

FIG. 3A is a plan view of the diaphragm 20 shown in FIG. 1. FIG. 3A is a view of an external appearance of the diaphragm 20 seen in the −Z direction. FIG. 3B is a sectional view at line IIIB-IIIB of FIG. 3A. FIG. 3C is a sectional view at line IIIC-IIIC of FIG. 3A. In FIGS. 3B and 3C, hatching to show the section is omitted. FIG. 3D is a bottom view of the diaphragm 20. FIG. 3D is a view of an external appearance of the diaphragm 20 seen in the Z direction or a turned-over view of the diaphragm 20 of FIG. 3A.

The diaphragm 20 includes a cushion rubber 20c and a sealing member 20s. A base fabric layer BF is provided in the cushion rubber 20c. The materials of the cushion rubber 20c and the sealing member 20s may be substantially the same as described in reference to FIG. 8A. The sealing member 20s has a sealing band SB and a touch line TL, the sealing band SB being a protrusion shaped annularly, the touch line TL being a protrusion shaped linearly along the Y-direction diameter of the sealing band SB.

The diaphragm 20 is pressed against the valve body 10 as described below to configure the diaphragm valve 100. Namely, the sealing band SB is pressed against and fixed to an area surrounding both the openings 101 and 102 of the valve body 10 shown in FIG. 2 and thus the external seal of the diaphragm valve 100 is achieved. Applying pressing force pressing the touch line TL against the valve seat 103 positioned between the openings 101 and 102 causes the channel between the openings 101 and 102 to be closed and realizes the closed state (S2). Releasing the pressing force pressing the touch line TL realizes the open state (S1).

The diaphragm 20 includes a first portion 21 having a first thickness T1 and a curved plate shape. The diaphragm 20 also includes a second portion 22 surrounding the first portion 21, the second portion 22 having a second thickness T2 smaller than the first thickness T1 and having a flat plate shape. The cushion rubber 20c and the sealing member 20s are layered in a direction of the first and second thicknesses T1 and T2. A first part of the cushion rubber 20c and a first part of the sealing member 20s configures the first portion 21 having the thickness T1. A second part of the cushion rubber 20c and a second part of the sealing member 20s configures the second portion 22 having the thickness T2. Since the first portion 21 has the thickness T1 larger than the thickness T2, even there are slight individual differences in the form of the valve body 10 or the compressor 60, the touch line TL may closely contact the valve seat 103 without a gap and realize the closed state (S2).

The sealing band SB is formed on the second portion 22 and surrounds the first portion 21. Accordingly, to achieve the external seal by pressing the sealing band SB against the valve body 10, only the second portion 22 having the thickness T2 smaller than the thickness T1 has to be pressed against the valve body 10 and the first portion 21 having the thickness T1 does not have to be pressed against the valve body 10. Pressing the second portion 22 having the thickness T2 does not cause the cushion rubber 20c to significantly extend out and thus a higher tightening torque may be applied to the bolts 30 and nuts 50. Further, even immediately after the first-time tightening, a rapid reduction in the reaction force in the cushion rubber 20c is moderated at the second portion 22 having the thickness T2 and thus the second-time tightening becomes unnecessary.

Figure 4:
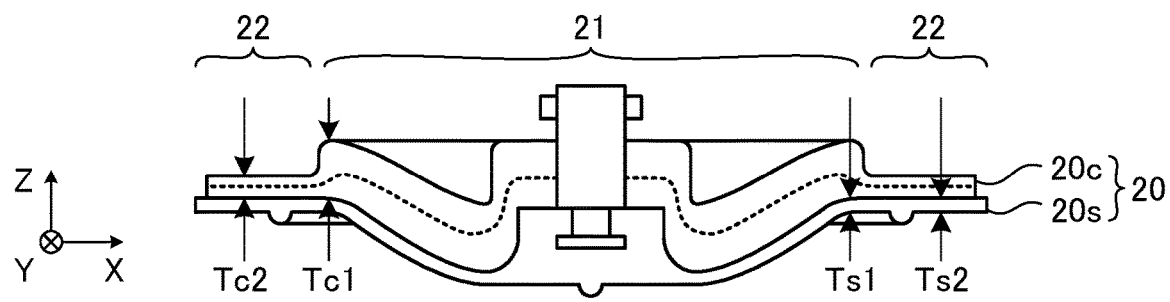
FIG. 4 is a sectional view showing the thicknesses of the respective parts of the diaphragm 20.

FIG. 4 is a sectional view showing the thicknesses of the respective parts of the diaphragm 20. FIG. 4 shows the same part as FIG. 3C; however, some reference symbols are omitted. Further, hatching to show the section is omitted. The first part of the cushion rubber 20c configuring the first portion 21 has a thickness Tc1 and the second part of the cushion rubber 20c configuring the second portion 22 has a thickness Tc2. The first part of the sealing member 20s configuring the first portion 21 has a thickness Ts1 and the second part of the sealing member 20s configuring the second portion 22 has a thickness Ts2.

The thickness Tc1 is larger than the thickness Tc2, and the difference Tc1-Tc2 between the thicknesses Tc1 and Tc2 is larger than the difference |Ts1−Ts2| between the thicknesses Ts1 and Ts2. The thicknesses Ts1 and Ts2 may be the same as each other. The large thickness Tc1 of the first part of the cushion rubber 20c, the first part configuring the first portion 21 pressed against the valve body 10 by the compressor 60, causes the diaphragm 20 to closely contact the valve body 10 without a gap even there are slight individual differences in the form of the valve body 10 or the compressor 60. The small thickness Tc2 of the second part of the cushion rubber 20c, the second part configuring the second portion 22 pressed against the valve body 10 by the bonnet 40, allows high seal contact pressure provided by tightening the bolts 30 and nuts 50 with a high tightening torque.

The thickness Tc2 of the second part of the cushion rubber 20c, configuring the second portion 22, is smaller than the thickness Tc1 of the first part of the cushion rubber 20c, configuring the first portion 21, and larger than the thickness Ts2 of the second part of the sealing member 20s, configuring the second portion 22. The thickness Tc2 smaller than the thickness Tc1 may allow high seal contact pressure provided by tightening the bolts 30 and nuts 50 with a high tightening torque. The thickness Tc2 larger than the thickness Ts2 may ensure the strength of the cushion rubber 20c.

The thickness Tc2 of the second part of the cushion rubber 20c, configuring the second portion 22, is half or less than half of the thickness Tc1 of the first part of the cushion rubber 20c, configuring the first portion 21. The thickness Tc2 that is half or less than half of the thickness Tc1 may allow high seal contact pressure provided by tightening the bolts 30 and nuts 50 with a high tightening torque.

4. Bonnet 40

Figure 5A:
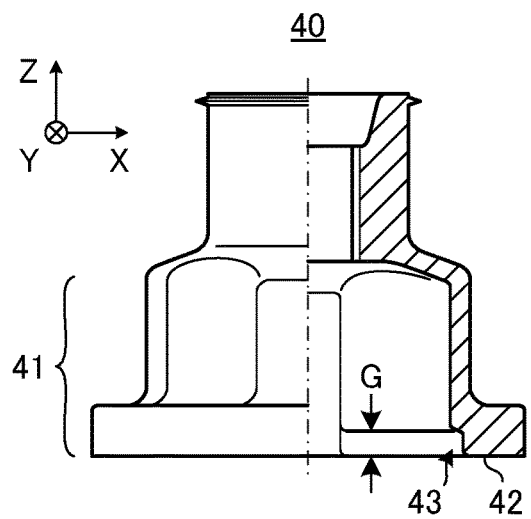
FIGS. 5A and 5B each show an external appearance, partially replaced with a section, of a bonnet 40 shown in FIG. 1.
Figure 5B:
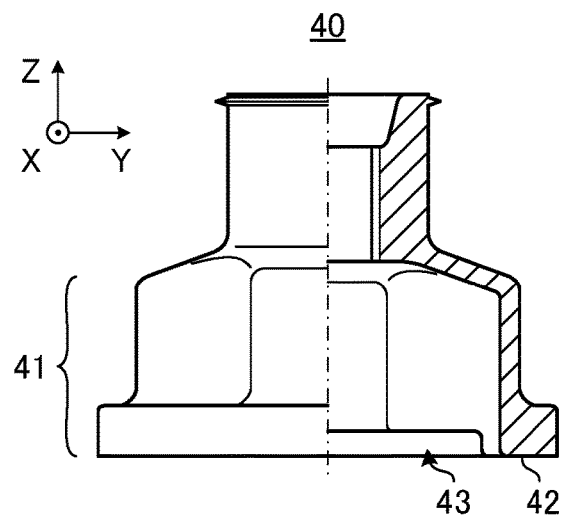
Figure 5C:
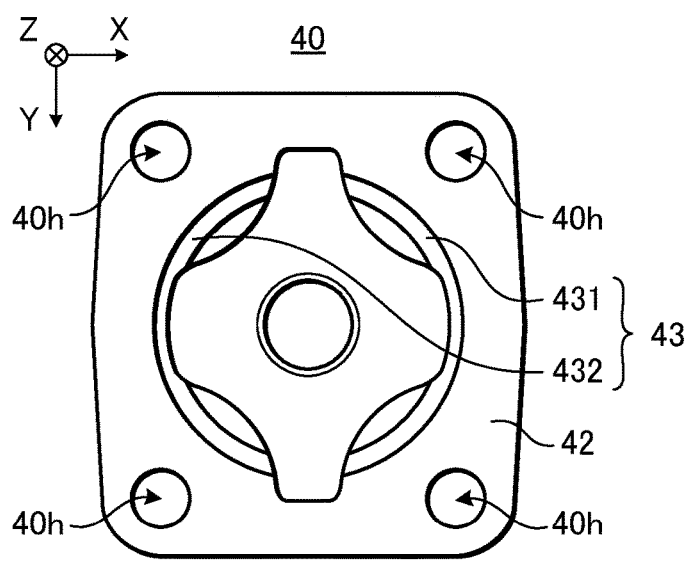
FIG. 5C is a bottom view of the bonnet 40.

FIGS. 5A and 5B each show an external appearance, partially replaced with a section, of the bonnet 40 shown in FIG. 1. The left half of FIG. 5A is a view of the external appearance of the bonnet 40 seen in the Y direction, while the right half is a view of the section of the bonnet 40, the section being parallel to the XZ plane, seen in the Y direction. The left half of FIG. 5B is a view of the external appearance of the bonnet 40 seen in the −X direction, while the right half is a view of the section of the bonnet 40, the section being parallel to the YZ plane, seen in the −X direction. FIG. 5C is a bottom view of the bonnet 40 seen in the Z direction.

The bonnet 40 has four bolt holes 40h. As shown in FIG. 2, the valve body 10 also has four bolt holes 10h in the corresponding positions. As shown in FIGS. 3A and 3D, the diaphragm 20 also has four bolt holes 20h in the corresponding positions. Four bolts 30 each penetrate the bolt holes 10h, 20h, and 40h and are tightened by a nut 50.

The numbers of the bolt holes and the bolts described here represent a mere example. The larger the size of the diaphragm 20, the more bolt holes and bolts may be required.

The bonnet 40 includes a tubular portion 41 that contains the compressor 60. The tubular portion 41 has a pressing surface 42 that presses the second portion 22 of the diaphragm 20 against the valve body 10 in the −Z direction. The tubular portion 41 also has an inner step 43 provided inner than the pressing surface 42 to contain a part of the first portion 21 of the diaphragm 20. The depth G of the inner step 43 in the −Z direction is larger than the difference T1-T2 between the thicknesses T1 and T2 of the first and second portions 21 and 22 of the diaphragm 20. Therefore, when the pressing surface 42 presses the second portion 22, pressure on the first portion 21 from the inner step 43 may be moderated and a high seal contact pressure may be applied to the second portion 22. The −Z direction corresponds to the pressing direction of the present invention.

The inner step 43 includes a first step portion 431 provided along a part of the ridge line formed by the pressing surface 42 and the inner circumferential surface of the tubular portion 41 of the bonnet 40 and a second step portion 432 provided along another part of the ridge line. Since the first and second step portions 431 and 432 are spaced apart from each other, the compressor 60 is capable of pressing the first portion 21 of the diaphragm 20 through the gap between the first and second step portions 431 and 432. Accordingly, the entire length of the touch line TL (see FIG. 3D), which is extending in the Y direction, may closely contact the valve body 10 and securely close the communication channel between the first and second flow paths C1 and C2.

5. Arrangement of Diaphragm 20 and Bonnet 40

Figure 6A:
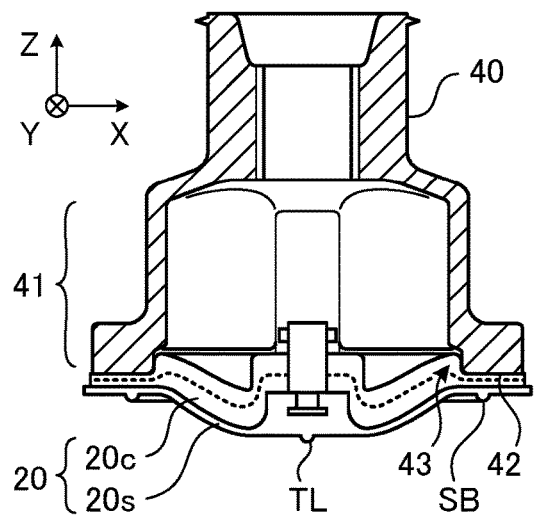
FIGS. 6A and 6B each are a sectional view of a combination of the diaphragm 20 and the bonnet 40.
Figure 6B:
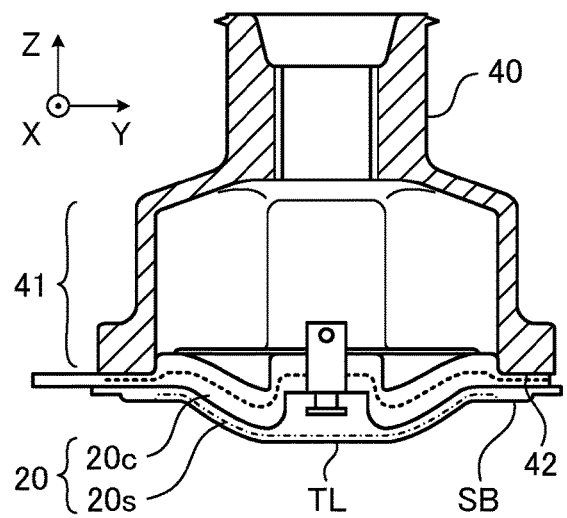

FIGS. 6A and 6B each are a sectional view of a combination of the diaphragm 20 and the bonnet 40. FIG. 6A is a view of a section of the diaphragm 20 and the bonnet 40, the section being parallel to the XZ plane, seen in the Y direction. FIG. 6B is a view of another section of the diaphragm 20 and the bonnet 40, the section being parallel to the YZ plane, seen in the −X direction. Hatching to show the section of the diaphragm 20 is omitted.

As shown in FIGS. 6A and 6B, the sealing band SB formed on the diaphragm 20 is positioned between the pressing surface 42 and the valve body 10, the pressing surface 42 being provided outer than the inner step 43 of the bonnet 40. Since there is no sealing band SB between the inner step 43 and the valve body 10, there is no need for the inner step 43 to press the diaphragm 20. Accordingly, even the bolts 30 and nuts 50 are tightened and the diaphragm 20 is pressed by the pressing surface 42, the diaphragm 20 does not inwardly extend out from the inner step 43 and the reduction of the reaction force is moderated.

6. Arrangement of Diaphragm 20 and Compressor 60

Figure 7:
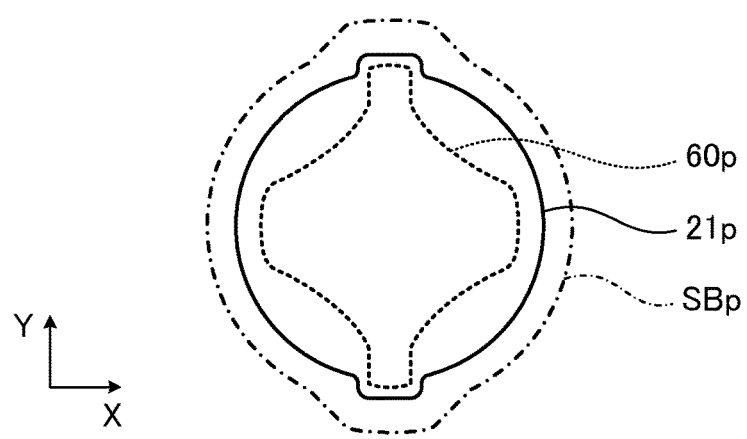
FIG. 7 shows an appearance in which forms of a first portion 21 and a sealing band SB of the diaphragm 20 and a form of a compressor 60 are projected in a −Z direction and superimposed.

FIG. 7 shows an appearance in which forms of the first portion 21 and the sealing band SB of the diaphragm 20 and a form of the compressor 60 are projected in the −Z direction and superimposed. FIG. 7 only shows the respective outer edges 21p, SBp, and 60p of the first portion 21, the sealing band SB, and the compressor 60.

As shown in FIG. 7, the outer edge 21p of the first portion 21 is positioned outer than the outer edge 60p of the compressor 60 and inner than the outer edge SBp of the sealing band SB. Accordingly, the compressor 60 does not press an area outer than the outer edge 21p of the first portion 21 but presses an area inner than the outer edge 21p. The inner portion of the diaphragm 20 that is pressed by the compressor 60 has the first thickness T1 and the peripheral portion of the diaphragm 20 on which the sealing band SB is formed has the second thickness T2 smaller than the first thickness T1. In the portion having the first thickness T1, the compressor 60 may cause the diaphragm 20 to closely contact the valve body 10 without a gap. In the portion having the second thickness T2, the diaphragm 20 may be strongly pressed against the valve body 10 to provide a high seal contact pressure.

7. Others

The diaphragm 20 in the above-described embodiment includes the sealing member 20s made of PTFE, however, the present disclosure is not limited to this. The cushion rubber 20c and the sealing member 20s may be replaced by an integrally molded rubber.

The compressor 60 in the above-described embodiment reciprocates by the spindle 70 rotated by the handle 90, however, the present disclosure is not limited to this. The diaphragm valve 100 may include a driving mechanism powered by air pressure or electric power.

What is claimed is:

1. A diaphragm that is pressed against a valve body and configures a diaphragm valve, comprising:
   a first portion having a first thickness and a curved plate shape; and
   a second portion surrounding the first portion and having a flat plate shape, the second portion including a sealing band surrounding the first portion, the second portion including an inner portion surrounded by the sealing band, the inner portion having a second thickness smaller than the first thickness to form a step, the sealing band protruding in a direction of the second thickness of the inner portion of the second portion, wherein
   the thickness of the most peripheral portion of the diaphragm is smaller than the first thickness of the first portion.

2. The diaphragm according to claim 1, further comprising:
   a cushion rubber and a sealing member layered in a direction of the first and second thicknesses, wherein
   a first part of the cushion rubber and a first part of the sealing member configure the first portion,
   a second part of the cushion rubber and a second part of the sealing member configure the second portion, and
   a difference between a thickness of the first part of the cushion rubber and a thickness of the second part of the cushion rubber is larger than a difference between a thickness of the first part of the sealing member and a thickness of the second part of the sealing member.

3. The diaphragm according to claim 1, further comprising:
- a cushion rubber and a sealing member layered in a direction of the first and second thicknesses, wherein
- a first part of the cushion rubber and a first part of the sealing member configure the first portion,
- a second part of the cushion rubber and a second part of the sealing member configure the second portion, and
- a thickness of the second part of the cushion rubber is smaller than a thickness of the first part of the cushion rubber and larger than a thickness of the second part of the sealing member.

4. A diaphragm that is pressed against a valve body and configures a diaphragm valve, comprising:
- a first portion having a first thickness and a curved plate shape;
- a second portion surrounding the first portion and having a flat plate shape, the second portion including a sealing band surrounding the first portion, the second portion including an inner portion surrounded by the sealing band, the inner portion having a second thickness smaller than the first thickness to form a step, the sealing band protruding in a direction of the second thickness of the inner portion of the second portion; and
- a cushion rubber and a sealing member layered in a direction of the first and second thicknesses, wherein
- a first part of the cushion rubber and a first part of the sealing member configure the first portion,
- a second part of the cushion rubber and a second part of the sealing member configure the second portion, and
- a thickness of the second part of the cushion rubber is half or less than half of a thickness of the first part of the cushion rubber.

5. A diaphragm valve, comprising:
- a valve body provided between first and second flow paths;
- a diaphragm including first and second portions, the first portion having a first thickness and a curved plate shape, the second portion surrounding the first portion and having a flat plate shape, the thickness of the most peripheral portion of the diaphragm being smaller than the first thickness of the first portion, the second portion including a sealing band surrounding the first portion, the second portion including an inner portion surrounded by the sealing band, the inner portion having a second thickness smaller than the first thickness to form a step, the diaphragm capable of being switched between first and second states, the diaphragm configuring with the valve body a communication channel between the first and second flow paths in the first state, the diaphragm closing the communication channel between the first and second flow paths in the second state;
- a compressor configured to apply pressing force pressing the first portion against the valve body in a pressing direction to switch the diaphragm to the second state and configured to release the pressing force pressing the first portion against the valve body to switch the diaphragm to the first state; and
- a bonnet configured to press the second portion against the valve body.

6. A diaphragm, comprising:
- a valve body provided between first and second flow paths;
- a diaphragm including first and second portions, the first portion having a first thickness and a curved plate shape, the second portion surrounding the first portion, the second portion having a second thickness smaller than the first thickness to form a step and having a flat plate shape, the thickness of the most peripheral portion of the diaphragm being smaller than the first thickness of the first portion, the second portion including a sealing band surrounding the first portion, the diaphragm capable of being switched between first and second states, the diaphragm configuring with the valve body a communication channel between the first and second flow paths in the first state, the diaphragm closing the communication channel between the first and second flow paths in the second state;
- a compressor configured to apply pressing force pressing the first portion against the valve body in a pressing direction to switch the diaphragm to the second state and configured to release the pressing force pressing the first portion against the valve body to switch the diaphragm to the first state; and
- a bonnet configured to press the second portion against the valve body, wherein
- the bonnet includes a tubular portion that contains the compressor, the tubular portion having a pressing surface and an inner step, the pressing surface pressing the second portion against the valve body, the inner step being inner in a radial direction of the tubular portion than the pressing surface and containing a part of the first portion, the inner step having a depth in the pressing direction larger than a difference between the first thickness of the first portion and the second thickness of the second portion.

7. A diaphragm valve, comprising:
- a valve body provided between first and second flow paths;
- a diaphragm including first and second portions, the first portion having a first thickness, the second portion surrounding the first portion, the second portion having a second thickness smaller than the first thickness to form a step, the diaphragm capable of being switched between first and second states, the diaphragm configuring with the valve body a communication channel between the first and second flow paths in the first state, the diaphragm closing the communication channel between the first and second flow paths in the second state;
- a compressor configured to apply pressing force pressing the first portion against the valve body in a pressing direction to switch the diaphragm to the second state and configured to release the pressing force pressing the first portion against the valve body to switch the diaphragm to the first state; and
- a bonnet including a tubular portion that contains the compressor, the tubular portion having a pressing surface and an inner step, the pressing surface pressing the second portion against the valve body, the inner step being inner in a radial direction of the tubular portion than the pressing surface and containing a part of the first portion, the inner step having a depth in the pressing direction larger than a difference between the first thickness of the first portion and the second thickness of the second portion.

8. The diaphragm valve according to claim 7, wherein the diaphragm includes a sealing band provided between the pressing surface and the valve body, the pressing surface being outer in the radial direction of the tubular portion than the inner step.

9. The diaphragm valve according to claim 8, wherein, when a form of the diaphragm and a form of the compressor are projected in the pressing direction and superimposed, an outer edge of the first portion is outer than an outer edge of the compressor and inner than an outer edge of the sealing band.

10. A diaphragm valve, comprising:
a valve body provided between first and second flow paths;
a diaphragm including first and second portions, the first portion having a first thickness and a curved plate shape, the second portion surrounding the first portion, the second portion having a second thickness smaller than the first thickness to form a step and having a flat plate shape, the second portion including a sealing band surrounding the first portion, the diaphragm capable of being switched between first and second states, the diaphragm configuring with the valve body a communication channel between the first and second flow paths in the first state, the diaphragm closing the communication channel between the first and second flow paths in the second state;
a compressor configured to apply pressing force pressing the first portion against the valve body in a pressing direction to switch the diaphragm to the second state and configured to release the pressing force pressing the first portion against the valve body to switch the diaphragm to the first state; and
a bonnet configured to press the second portion against the valve body, wherein
the bonnet includes a tubular portion that contains the compressor, the tubular portion having a pressing surface and an inner step, the pressing surface pressing the second portion against the valve body, the inner step being inner than the pressing surface and containing a part of the first portion, the inner step having a depth in the pressing direction larger than a difference between the first thickness of the first portion and the second thickness of the second portion, and
the inner step includes first and second step portions, the first step portion being provided along a part of a ridge line formed by the pressing surface and an inner circumferential surface of the bonnet, the second step portion being provided along another part of the ridge line, the first and second step portions are spaced apart from each other.

11. A diaphragm valve, comprising:
a valve body provided between first and second flow paths;
a diaphragm including first and second portions, the first portion having a first thickness, the second portion surrounding the first portion, the second portion having a second thickness smaller than the first thickness to form a step, the diaphragm capable of being switched between first and second states, the diaphragm configuring with the valve body a communication channel between the first and second flow paths in the first state, the diaphragm closing the communication channel between the first and second flow paths in the second state;
a compressor configured to apply pressing force pressing the first portion against the valve body in a pressing direction to switch the diaphragm to the second state and configured to release the pressing force pressing the first portion against the valve body to switch the diaphragm to the first state; and
a bonnet including a tubular portion that contains the compressor, the tubular portion having a pressing surface and an inner step, the pressing surface pressing the second portion against the valve body, the inner step being inner than the pressing surface and containing a part of the first portion, the inner step having a depth in the pressing direction larger than a difference between the first thickness of the first portion and the second thickness of the second portion, wherein
the inner step includes first and second step portions, the first step portion being provided along a part of a ridge line formed by the pressing surface and an inner circumferential surface of the bonnet, the second step portion being provided along another part of the ridge line, the first and second step portions are spaced apart from each other.

* * * * *